(12) United States Patent
Tzimas et al.

(10) Patent No.: US 10,680,441 B2
(45) Date of Patent: Jun. 9, 2020

(54) CONTROL OF HIGH-VOLTAGE, DIRECT CURRENT SYSTEMS

(71) Applicant: GENERAL ELECTRIC TECHNOLOGY GMBH, Baden (GB)

(72) Inventors: Antonios Tzimas, Stafford (GB); Guillaume Lucas, Stafford (GB); Kevin Dyke, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 16/302,314

(22) PCT Filed: May 9, 2017

(86) PCT No.: PCT/EP2017/061033
§ 371 (c)(1),
(2) Date: Nov. 16, 2018

(87) PCT Pub. No.: WO2017/198494
PCT Pub. Date: Nov. 23, 2017

(65) Prior Publication Data
US 2019/0296553 A1    Sep. 26, 2019

(30) Foreign Application Priority Data
May 17, 2016  (GB) .................................. 1608629.0

(51) Int. Cl.
*H02J 3/00*  (2006.01)
*H02J 3/36*  (2006.01)
*H02M 5/04*  (2006.01)

(52) U.S. Cl.
CPC .................. *H02J 3/36* (2013.01); *H02M 5/04* (2013.01); *Y02E 60/60* (2013.01)

(58) Field of Classification Search
CPC .................................... H02J 3/36; H02M 5/04
See application file for complete search history.

(56) References Cited

U.S. PATENT DOCUMENTS

2004/0090213 A1   5/2004  Barthold
2017/0117817 A1*  4/2017  Ahmed ............... H02M 7/7575

FOREIGN PATENT DOCUMENTS

EP        0868002 A1   3/1998
JP        H0729691 A   1/1995
WO        9734159 A1   9/1998

OTHER PUBLICATIONS

Great Britain Search Report and Written Opinion dated Nov. 7, 2016 which was issued in connection with GB1608629.0 which was filed on May 17, 2016.

(Continued)

*Primary Examiner* — Adolf D Berhane
*Assistant Examiner* — Afework S Demisse
(74) *Attorney, Agent, or Firm* — Eversheds Sutherland (US) LLP (57) ABSTRACT

The present invention provides methods and apparatus for controlling HVDC power transmission systems so as to increase the effective lifetime of cables carrying the DC power (and particularly the extruded polymer insulation of those cables). The method includes entering a maintenance mode in which the electrical properties applied to the cable are varied so as to facilitate diffusion of space charge accumulation in the extruded polymer insulation.

15 Claims, 6 Drawing Sheets

(56) References Cited

OTHER PUBLICATIONS

International Search Report and Written Opinion dated Jan. 9, 2017 which was issued in connection with PCTPCT/EP2017/061033 which was filed on May 9, 2017.
Fabiani D. et. al: "HVDC Cable Design and Space Charge Accumulation Part 3: Effect of Temperature Gradient", IEEE Electrical Insulation Magazine vol. 24, No. 2 Mar. 1, 2008.

* cited by examiner

CONTROL OF HIGH-VOLTAGE, DIRECT CURRENT SYSTEMS

The present invention relates to high-voltage, direct current (HVDC) systems, and particularly to methods and devices for managing the power flow in such systems so as to prolong the lifetime of extruded polymer cables.

BACKGROUND

Direct current (DC) power transmission is used in a number of different applications. High-voltage DC (HVDC) is particularly useful for power transmission over long distances and/or interconnecting alternating current (AC) networks that operate at different frequencies. A first station may therefore transmit electrical energy to a second station over a DC transmission line, e.g. an overhead line or subsea or buried cable. The first station may generate the DC supply by conversion from a received AC input supply. The second station then typically provides conversion back from DC to AC. Each of the first and second stations may therefore typically comprise a voltage source converter (VSC) (or any other suitable mechanism, such as a line-commutated converter for example) for converting from AC to DC or vice versa. More complicated networks comprising multiple DC links and multiple stations are also known.

Cables using extruded insulating materials, such as the polyolefin group and its composite counterparts, are well known. When used in AC applications, where the voltage varies cyclically about ground at the grid frequency (e.g. 50 Hz or 60 Hz), space charge has no opportunity to accumulate in the cable as the polarity of the electric field constantly varies about zero.

In DC applications, however, the polarity of the electric field is constant and this can lead to space charge accumulation in the cable via a number of different mechanisms. In HVDC systems, where conditions include voltages in the order of hundreds of kilovolts, space charge can accumulate even in the low mobility carriers which are inherent to extruded cable insulation.

Space charge accumulation in extruded cables accelerates cable ageing and can lead to premature insulation breakdown or reduced rating. Methods and devices for mitigating space charge accumulation in HVDC systems are therefore required.

SUMMARY OF THE DISCLOSURE

According to a first aspect of the invention there is provided a method of operating a high-voltage direct-current (HVDC) system, the HVDC system comprising at least one DC link, at least part of the DC link comprising a cable with extruded polymer insulation, the DC link being operable in a maintenance mode and at least one other mode of operation. The method comprises entering the maintenance mode, in which the electrical properties applied to the cable are varied, or modulated, so as to facilitate diffusion of space charge accumulation in the extruded polymer insulation.

According to a second aspect of the invention, there is provided a control system for a high-voltage, direct-current (HVDC) system, the HVDC system comprising at least one DC link, at least part of the DC link comprising a cable with extruded polymer insulation, the DC link being operable in a maintenance mode and at least one other mode of operation. The control system is configured to control the DC link to enter the maintenance mode, in which the electrical properties applied to the cable are varied so as to facilitate diffusion of space charge accumulation in the extruded polymer insulation.

The control system may comprise processor circuitry and memory, or another computer-readable storage medium. The memory or other computer-readable storage medium may comprise code which, when executed by the processor circuitry, causes the control system to carry out the methods described herein.

BRIEF DESCRIPTION OF THE DRAWINGS

The invention will now be described by way of example only, with reference to the accompanying drawings, of which.

DETAILED DESCRIPTION

Figure 1:
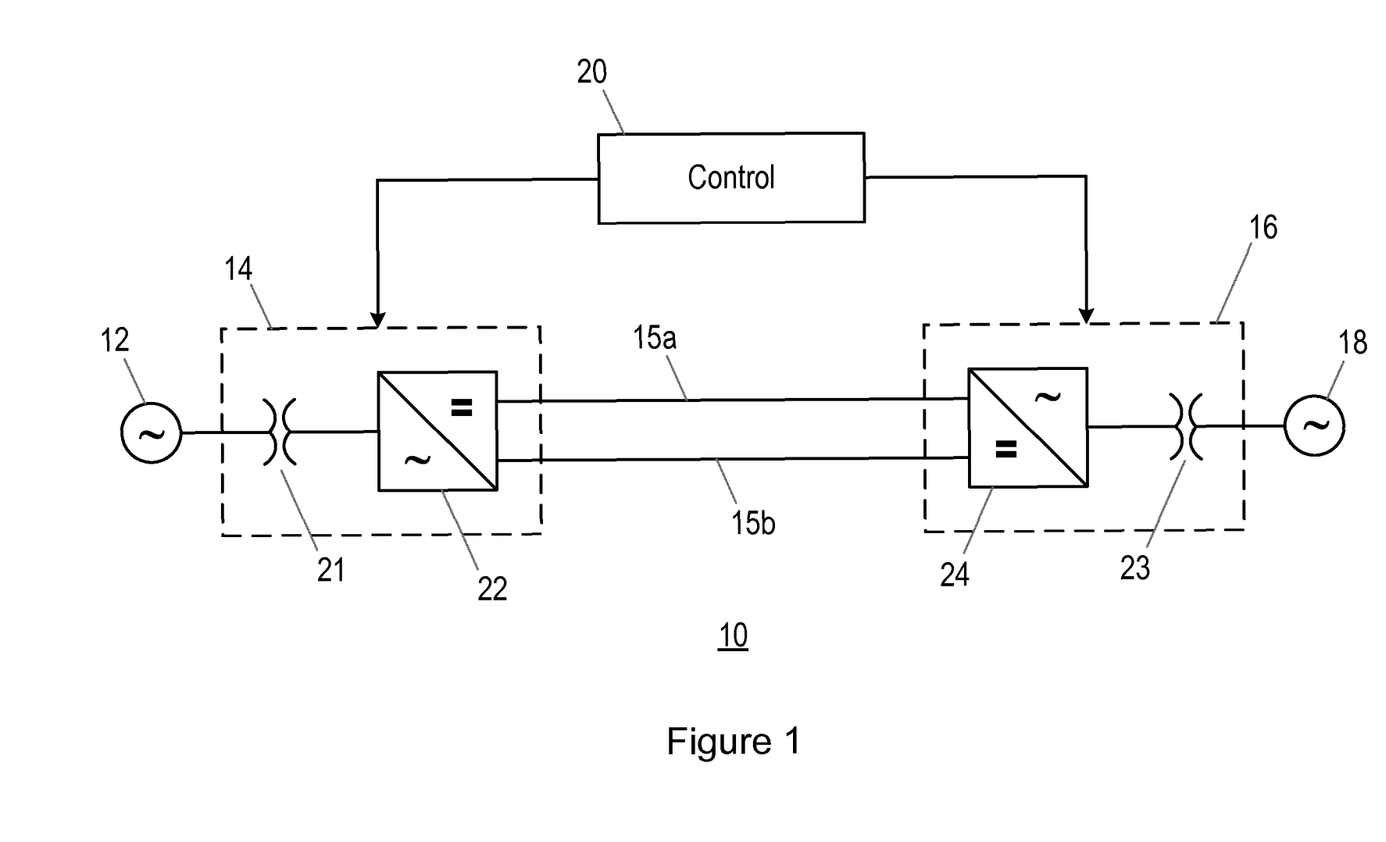
FIG. 1 illustrates one example of a DC network.

FIG. 1 shows an example of a DC power transmission network 10 according to embodiments of the invention. The network 10 shown in FIG. 1 comprises a DC link connected between two AC systems; however, the invention is applicable in general to a DC link in any power transmission system.

The network 10 comprises a first AC power supply 12. For example, the first AC power supply may be a power generator such as a wind farm, or an electric grid operating at a first frequency. The AC supply is provided to a converter station 14, which acts to convert the AC supply to a DC supply for onward transmission over a DC link to a second converter station 16. The second converter station 16 is arranged in an opposite configuration to the first station 14, and converts the DC supply back to AC for onward transmission via a second AC supply 18. The second AC supply 18 may have the same or a different frequency of operation than the first supply 12.

The first station 14 comprises a transformer 21 and a converter 22 coupled in series. The transformer acts to transform the AC voltage from that of the AC supply 12 into that required for operation of the converter 22. In the present configuration, the converter 22 as a rectifier, converting the AC supply into a corresponding DC supply for output via the DC link. The converter 22 can be any device that is suitable for converting a high-voltage AC supply into a high-voltage DC supply. For example, the converter 22 could be a line-commutated converter (LCC) or a voltage source converter (VSC), such as a modular multi-level converter (MMC). The second station 16 similarly comprises a transformer 23 and a converter 24, arranged in series but in the opposite order to those in the first station 14. The converter 24 thus acts as an inverter, converting the DC supply received via the DC link to AC, while the transformer 23 converts the voltage output from the converter 24 to that suitable for operation of the converter 24 to that required for onward transmission on the second AC supply 18. It will be understood by those skilled in the art that a large number of features are omitted from FIG. 1 for the purposes of clarity.

A control system 20 generates control signals for the first and second converter stations 14, 16 and so controls the voltage which is applied to the DC link and the current which flows through the DC link. For example, the voltage which is applied to the DC link may be controlled by varying the turns ratio of either or both of the transformers 21, 23, and/or altering the control of the converters 22, 24. The current flowing in the DC link may be varied by controlling the voltages in either converter (i.e. the current being proportional to the voltage difference). Alternatively, the current may be varied by controlling a dynamic braking system (DBS) and/or controlling a current flow controller (CFC) in either the first station 14 or the second station 16.

The above passage describes the first station 14 as the rectifier (i.e. converting an AC signal to a corresponding DC signal) and the second station 16 as the inverter (i.e. converting a DC signal to a corresponding AC signal). Of course, it will be clear to those skilled in the art that the stations could operate in the reverse order without departing from the scope of the invention as defined in the claims appended hereto.

The DC link comprises two cables 15a, 15b (collectively, 15), which can be arranged in one of several different configurations. For example, in an asymmetrical monopole configuration, one of the cables 15a, 15b is coupled to ground, while the other is held at a potential high above or below ground. In a symmetrical monopole configuration, the DC supply is output across both cables, with each cable held at a potential which is half the overall DC voltage, in opposite polarity. A bipolar configuration is similar to a symmetrical configuration, but each cable 15 is held at the full potential with respect to ground, in opposite polarity. Bipolar operation typically requires the presence of two converters in each station (one for each cable and in some cases a metallic return). The invention is applicable to all such configurations.

Figure 2:
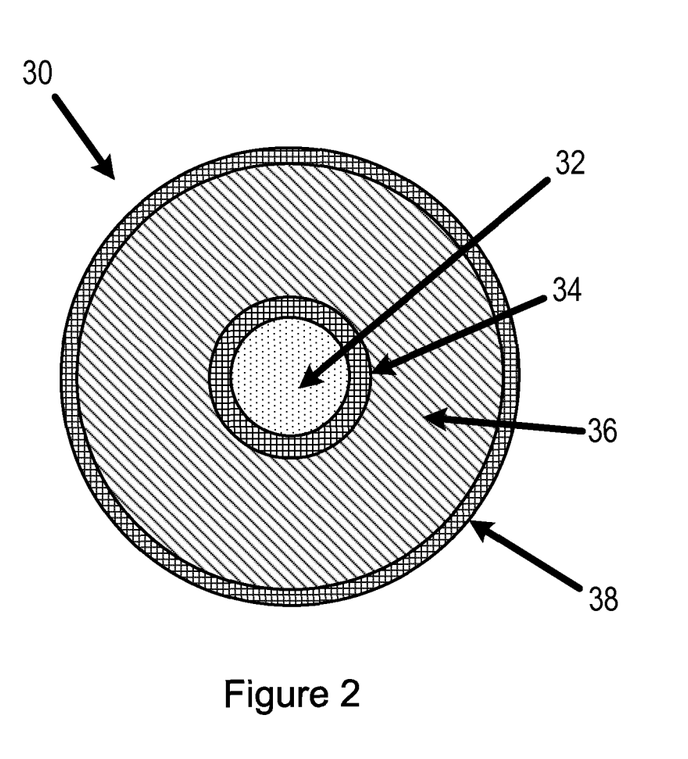
FIG. 2 illustrates one example of a cable forming at least part of a DC link of the DC network shown in FIG. 1.

According to embodiments of the invention, at least part of one or more of the cables 15 is provided by a cable comprising extruded polymer insulation. In an embodiment, substantially the entire length of one or more of the cables 15 may be provided by a cable comprising extruded polymer insulation. FIG. 2 shows an example of such a cable 30 in cross section.

The cable 30 comprises a conductive core 32, which carries the majority of current. The core 32 may comprise a plurality of strands, and be manufactured from a conductive material such as copper.

Surrounding the core 32 is an inner coaxial layer of semiconducting material 34, and surrounding that is the main layer of insulating material 36. A further outer layer of semiconducting material 38 lies outside the insulation 36, while the cable 30 may also comprise an outer protective sheath (not illustrated) to protect it from the environment and/or provide an earthed layer to conduct leakage currents if needed. The function of the semiconductor layers 34, 38 is to prevent air-filled cavities from forming between the conducting layers (i.e. the conducting core 32 and/or the outer protective sheath) and the insulating material 36, so that electric discharges cannot arise and endanger the insulation material.

The insulating material 36 comprises any extruded material such as the polyolefin group and its composite counterparts. For example, in one embodiment, the insulating material is cross-linked polyethylene (XLPE). The insulating material 36 may further comprise nanoparticles to improve the insulation properties of the material.

XLPE extruded polymer in general exhibits excellent dielectric properties making it suitable for use in high voltage cables. However, in DC applications, where the electric potential is high and has a constant polarity, space charge can accumulate over time in and around the insulating material 36, particularly at the interfaces of the insulating material 36 with the inner and outer semiconductor layers 34, 38. This accelerates cable ageing and can lead to premature insulation breakdown or reduced rating.

Embodiments of the invention provide methods and apparatus for controlling the electrical properties applied to the cable so as to minimize the accumulation of space charge within the cable and/or to facilitate the diffusion of space charge from the cable. For example, space charge accumulates primarily as a result of the constant high voltage that is applied to the cable over an extended period of time. In embodiments, the voltage applied to the cable may be temporarily reduced from its normal operating value, so as to reduce the electrical stress placed on the cable—both reducing the propensity for space charge to accumulate, and allowing accumulated space charge to disperse. In embodiments, the current flowing through the cable may be temporarily increased from its normal operating value, so as to increase the temperature in the cable for a period of time. The increased temperature increases the DC conductance of the insulation and therefore increases the rate at which accumulated space charge can disperse.

Thus by temporarily entering a maintenance mode, in which one or more of the mechanisms above is employed to reduce the rate of space charge accumulation and/or facilitate the diffusion of accumulated space charge (but also in which the transfer of power over the cable may be less efficient), the lifetime of cables comprising extruded polymer insulation can be extended.

Figure 3:
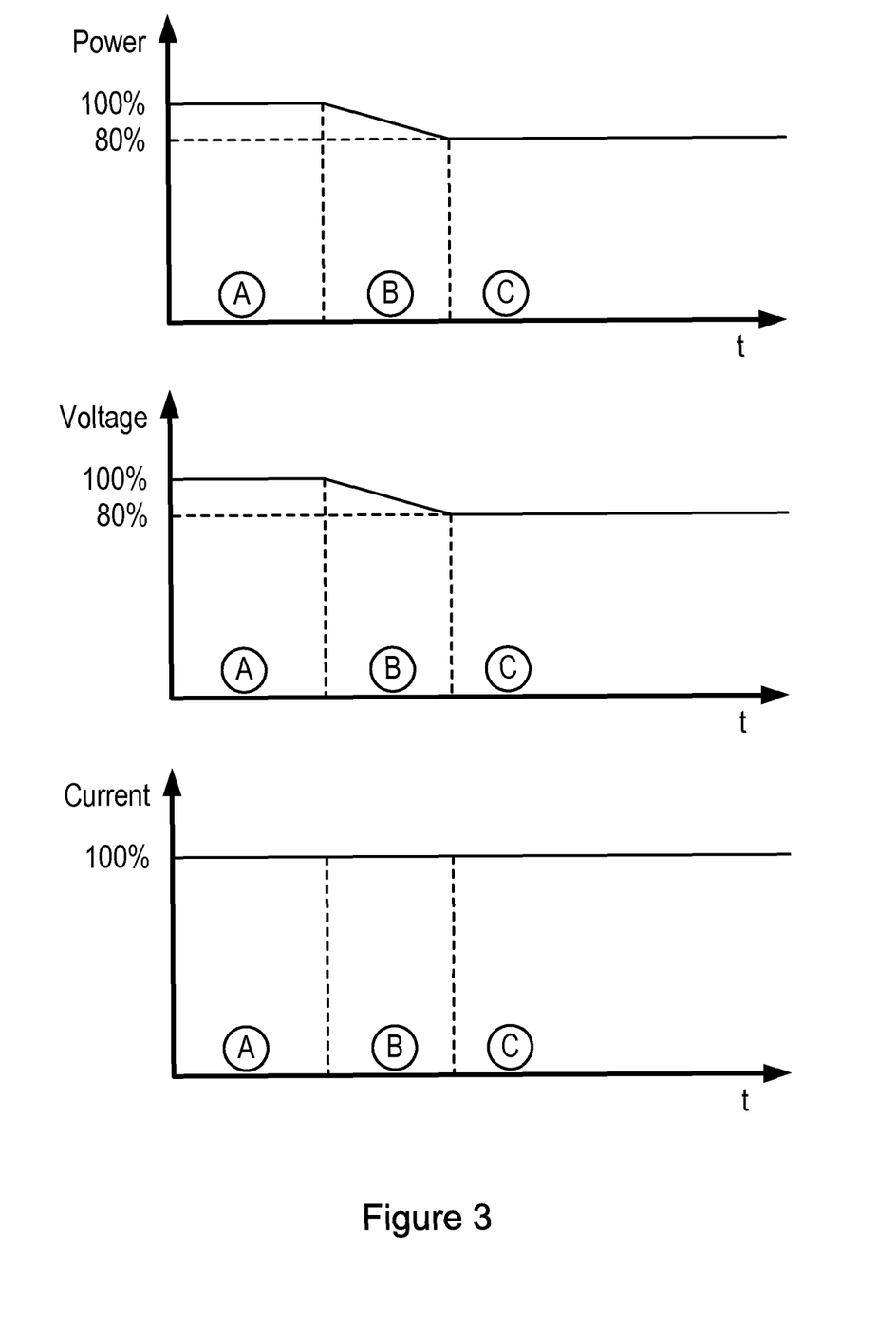
FIG. 3 illustrates the power, voltage and current characteristics over time for a DC link entering a maintenance mode according to embodiments of the invention.

FIG. 3 shows the power, voltage and current characteristics over time for a DC link entering a maintenance mode according to embodiments of the invention.

During the first period, labelled A, both the voltage and the current are constant and at relatively high levels. For example, the current and voltage may both be at their respective maximum permissible values (i.e. 100%), and therefore the power transmission is also at its maximum permissible value. In other embodiments, the current and voltage may take different, lower values prior to entering a maintenance mode.

At the end of period A, a decision is taken to enter a maintenance mode. The decision may be taken for a number of different reasons, and these are discussed below.

The following period, labelled B, is a transition period in which the voltage applied to the DC link is gradually reduced to a lower value. In the illustrated embodiment the voltage is reduced to 80% of its maximum permissible value, but in practice the voltage may be reduced to any lower value in accordance with the needs of the operator of the DC link. The voltage may even be reduced to 0%.

During this transition period, the current is maintained at its previous level. The current is therefore kept relatively high.

In the final period, labelled C, the DC link is in a maintenance mode according to embodiments of the invention in which the power transmission is at 80% of its maximum permissible value. Of course, in other embodiments the power transmission may be at different values according to the different values of current and voltage. The power output may even increase when entering the maintenance mode in certain embodiments. See, for example, FIG. 5.

The voltage is at a relatively low value, while the current is maintained at a relatively high value. Under ordinary circumstances, the power transmission would be reduced to 80% from 100% by reducing the current and keeping the voltage at a high level as this maximises the efficiency of power transmission. However, in a maintenance mode according to embodiments of the invention, the voltage is reduced while the current is kept relatively high. Although power is transmitted at lower efficiency, therefore, this increases the thermal stress placed on the DC link for a given power transmission (i.e. the temperature in the cables 15 with 100% current and 80% voltage is higher than it would be if the current were at 80% and the voltage at 100%), and also lowers the electric field strength in the cables 15. Both of these factors help accumulated space charge in the cables 15 to diffuse.

Note that the DC link will in general only be placed in the maintenance mode temporarily (e.g. for a period not exceeding an hour, 3 hours, 6 hours or 12 hours), in order to allow the space charge to diffuse. Over a longer period of time, the disadvantages of lower power transmission efficiency and higher temperatures become more significant, while the benefits of increased space charge diffusion are reduced (as the majority of space charge will diffuse in a relatively short period of time).

Figure 4:
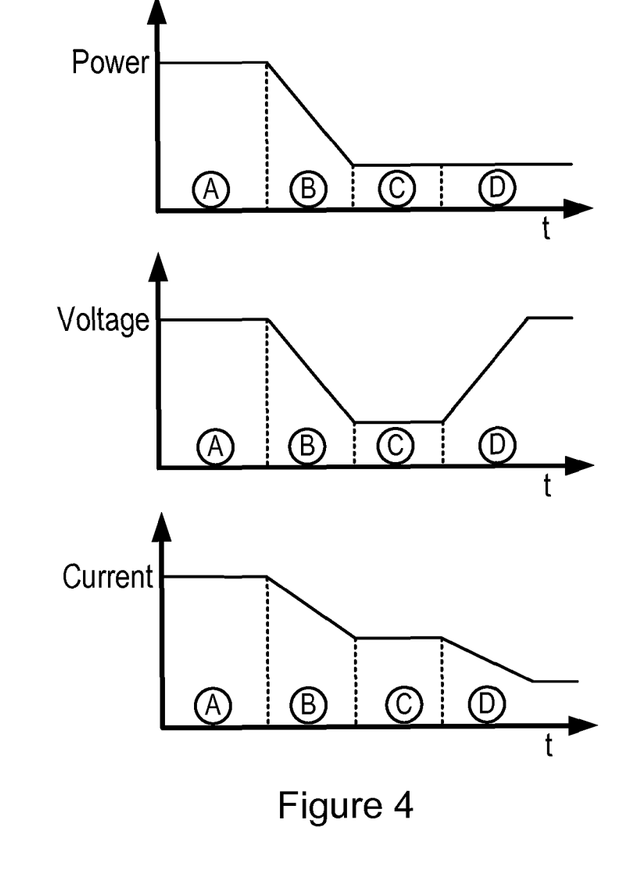
FIG. 4 illustrates the power, voltage and current characteristics over time for a DC link undergoing a transition from a relatively high load state to a relatively low load state according to embodiments of the invention.

FIG. 4 illustrates the power, voltage and current characteristics over time for a DC link entering the maintenance mode during a transition from a relatively high load state to a relatively low load state.

During the first period of the illustration, labelled A, both the voltage and the current are constant and at high levels. For example, the current and voltage may both be at their respective maximum permissible levels, and this of course means that the power transmission is at its corresponding maximum value during period A. Alternatively, the current and/or voltage may be at a level below their maximum permissible values.

At the end of period A, a decision is taken to reduce the power transmission from its previous high level to a lower level. For example, the network receiving the power (e.g. AC supply 18) may experience a drop in demand and thus require less power. At the same time, a decision is taken to enter a maintenance mode according to embodiments of the invention.

The following period, labelled B, is a transition period during which the transmitted power is gradually reduced from its previous value to a specified lower value. This is achieved by reducing both the voltage applied to the cable and the current which is applied to the cable. However, as the DC link is now in a maintenance mode, the voltage is reduced to a low value, while the current is reduced only to an intermediate value.

In the next period, labelled C, these values reach their steady state and the output power reaches its required lower value. The voltage is relatively low, and can be set to a value that halts accumulation of space charge and allows accumulated space charge to dissipate. The current is lower than in period A, but is set at a higher value than would normally be the case to increase the temperature in the cable and so facilitate diffusion of the accumulated space charge (by increasing the mobility of charge carriers in the cable). These electrical characteristics are desirable for overcoming the problem of space charge accumulated and extending the lifetime of the cable. However, the increased thermal stress placed on the cable can have other negative effects on the condition of the cable and in general transfers power less efficiently. Accordingly, the DC link is placed in the maintenance mode only temporarily and at the end of period C a decision is taken to exit the maintenance mode and resume normal operation.

In the final period, labelled D, the current is decreased further, to a low value, while the voltage is increased to the value it previously held in period A (which may be its maximum permitted value). The new values of voltage and current are selected such that the transmitted power (calculated by multiplication of the current and voltage) stays substantially constant at its specified lower value. However, as the current is lower and the voltage is higher, the temperature in the cable is reduced and power is transmitted more efficiently.

Overall, then, the transmitted power is reduced from its initial higher value to a specified lower value. However, the transition is achieved in conjunction with the use of a temporary maintenance period in which the value of the current is higher than would otherwise be the case, and the value of the voltage is lower than would otherwise be the case. This temporary mode promotes the diffusion of accumulated space charge by increasing the temperature in the cable at the expense of lower efficiency.

Figure 5:
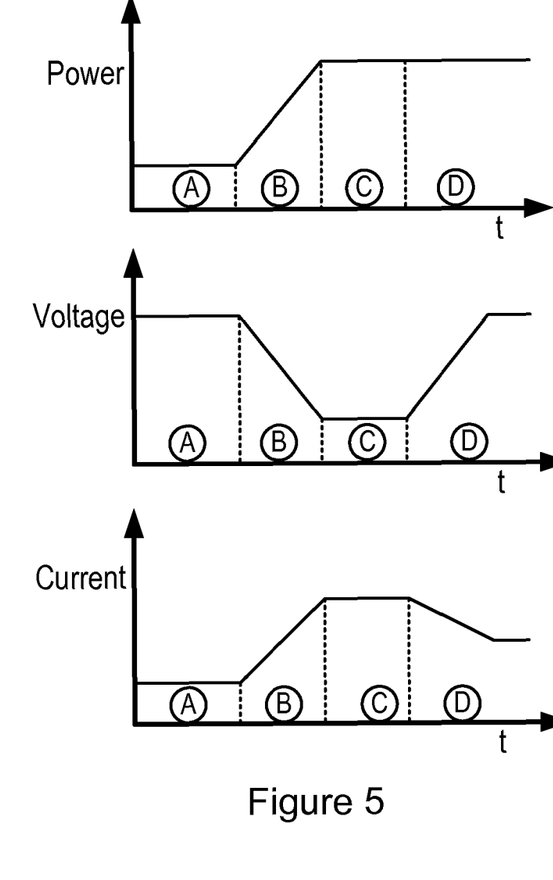
FIG. 5 illustrates the power, voltage and current characteristics over time for a DC link undergoing a transition from a relatively low load state to a relatively high load state according to embodiments of the invention.

FIG. 5 illustrates the power, voltage and current characteristics over time for a DC link entering a maintenance mode during a transition from a relatively low load state to a relatively high load state.

During the first period of the illustration, labelled A, the voltage is constant and at relatively high level, while the current is constant and at a relatively low level. For example, the current may be at its minimum permissible level, while the voltage may be at its maximum permissible level. The overall transmitted power is therefore at a relatively low level.

At the end of period A, a decision is taken to increase the power transmission from its previous low level to a higher level. For example, the network receiving the power (e.g. AC supply 18) may experience an increase in demand and thus require more power. At the same time, a decision is taken to enter a maintenance mode according to embodiments of the invention.

The following period, labelled B, is a transition period during which the transmitted power is gradually increased from its previous value to a specified higher value. For example, the power may be increased to a maximum permissible value. Because the DC link is now in a maintenance mode, this is achieved by reducing the voltage applied to the cable but increasing the current at a greater rate such that overall the power is increased (on the understanding that power is calculated by the multiplication of current with voltage).

In the next period, labelled C, these values reach their steady state and the output power reaches its required higher value. The voltage is relatively low, and can be set to a value that halts accumulation of space charge and allows accumulated space charge to dissipate. The current is set at a higher value than would normally be the case to increase the temperature in the cable and so facilitate diffusion of the accumulated space charge (by increasing the mobility of charge carriers in the cable). The DC link is placed in the maintenance mode only temporarily and at the end of period C a decision is taken to exit the maintenance mode and resume normal operation.

In the final period, labelled D, the current is decreased to an intermediate value that is lower than its value in period C, but higher than its value in period A. The voltage is increased to the high value it previously held in period A (e.g. its maximum permitted value). The new values of voltage and current are selected such that the transmitted power (calculated by multiplication of the current and voltage) stays substantially constant at its specified higher value. However, as the current is lower and the voltage is higher, the temperature in the cable is reduced and power is transmitted more efficiently.

Overall, the transmitted power is increased from its initial low value to a specified higher value. The transition is achieved in conjunction with the use of a temporary maintenance period in which the value of the current is higher than would otherwise be the case, and the value of the voltage is lower than would otherwise be the case. This temporary mode promotes the diffusion of accumulated space charge by increasing the temperature in the cable at the expense of lower efficiency.

Figure 6:
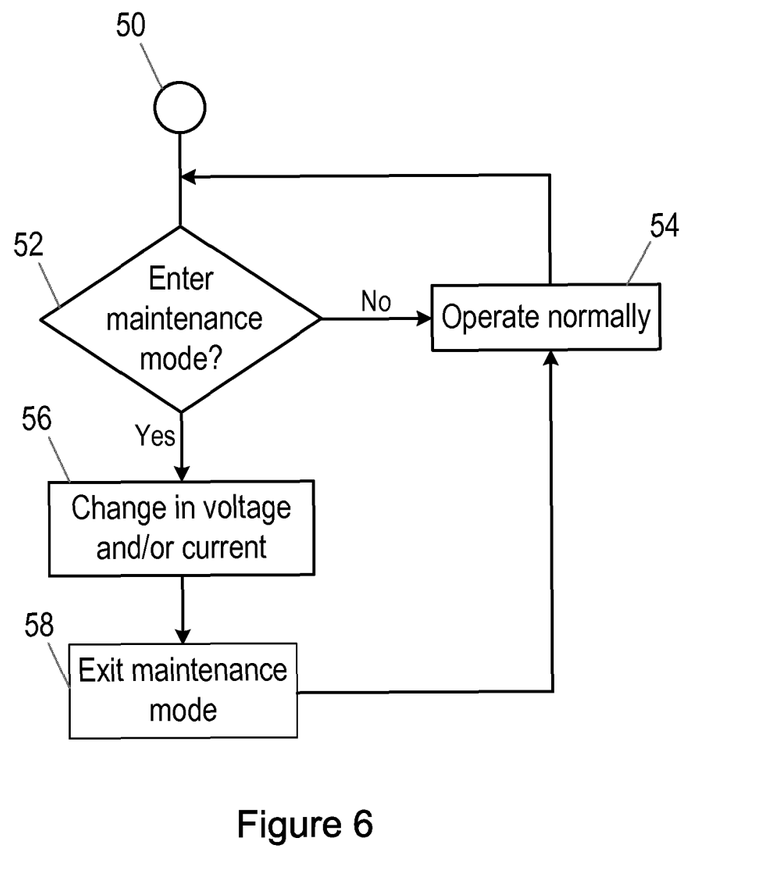
FIG. 6 illustrates a method according to embodiments of the invention.

FIG. 6 is a flowchart illustrating schematically a method according to embodiments of the invention. The method may be implemented in the control system 20, for example. The method begins in step 50.

In step 52, a decision is taken whether to enter a maintenance mode.

There are a large number of possible triggers for entry to a maintenance mode. For example, the maintenance mode may be entered according to a fixed schedule, which specifies maintenance on a weekly, monthly, quarterly, or annual basis, i.e. at a defined frequency. As the cable ages, physical defects are more likely to occur in one or more of the layers 32, 34, 36, 38, and irreversible changes may occur to the properties of the material. Such defects and changes can lead to an increased likelihood of space charge accumulation and therefore the frequency at which maintenance occurs can be increased as a function of the age of the cable. The longer a cable has been in service, the more frequently it will be placed in a maintenance mode.

Power demand on a grid network supplying the public tends to vary in a substantially similar manner year on year. Fixed maintenance slots may be scheduled over the year to maximise the lifetime of the cables and to minimise disruption to the network.

Space charge tends to accumulate when the local electric field is high, i.e. above some threshold value that will vary according to the design of the cable and the quality of the materials used. Space charge accumulation is therefore likely to occur during high demand periods, when the voltage will likely be at its maximum value to maximise the efficiency with which power is transferred over the DC link. A decision may therefore be taken to enter the maintenance mode during or shortly after a transition from a period in which the load on the network is relatively high to a period in which the load is relatively low. The DC link thus enters a maintenance mode shortly after a period of high stress on the network (when space charge is likely to have accumulated) and enables the space charge to diffuse. Further, the low load allows voltage to be dropped without substantially disrupting the performance of the network.

Such transitions (i.e. from a high-load state to a low-load state) are likely to occur in the spring months and for this reason one or more maintenance slots may be scheduled annually in the spring.

In further embodiments, a decision may be taken to enter a maintenance mode when the power transmission over the DC link has been at a value equal to or above a threshold value (e.g. 100% of the maximum permissible value, or 100% of the nominal rating for the DC link) for greater than a threshold period of time.

In further embodiments, the control system 20 may comprise one or more sensors at various locations along the cables 15, configured to measure the localised electric field at one or more locations along the cables. The control system 20 can compare the measured values, or the rates of change of those values, to one or more thresholds and, based on the comparison, initiate a maintenance mode. For example, the threshold may be a defined value of electric field strength corresponding to a value above which space charge can accumulate in the cable. Alternatively, or additionally, the threshold may be a defined value for the rate of change of the electric field over time. That is, if the localised electric field increases at a relatively high rate, this can be indicative of space charge accumulation in the measured area. The control system 20 may initiate a maintenance mode if the measured values exceed the threshold, or the control system 20 may initiate a maintenance mode only if the measured values exceed the threshold for more than a defined period of time. The latter embodiment can prevent transient electric fields from adversely affecting operation of the network.

In further embodiments, the measured values of electric field can be input to a space charge model and used to predict the likelihood of space charge accumulation. A decision can then be made, based on the output of the space charge model, to enter the maintenance mode and so avoid space charge accumulation and/or diffuse accumulated space charge.

If the outcome of step 52 is that a maintenance mode should not be entered, the process moves to step 54 and the DC link maintains its current mode of operation. For example, the DC link may have one or more modes of operation optimised for maximum efficiency in the transfer of power. These modes may comprise operating the DC link at its maximum permissible voltage, and regulating the current so as to achieve a given power output. For example, at periods of high load, the DC link may be operated at its maximum permissible values of voltage and current.

If the outcome of step 52 is that the maintenance mode should be entered, the process moves to step 56 in which the maintenance mode is entered. A DC link operating in a maintenance mode according to embodiments of the invention will typically operate at a lower voltage than is typically the case (i.e. below the maximum voltage at which power transfer efficiency is maximised), and at a higher current than is typically the case to achieve a given power output. Thus, assuming a constant power output, in step 56 the voltage applied to the DC link is reduced, while the current flowing in the DC link is increased.

Note that if the power output is to be reduced, as shown in FIG. 4, the current may be reduced as well as the voltage upon entering the maintenance mode. That is, the voltage during the maintenance mode must be at a relatively low level to prevent the accumulation of space charge. In general, the voltage will be reduced to a value which is lower than a threshold value at which space charge accumulation occurs. The precise value of this threshold will vary according to the design and quality of the cable. The voltage may be reduced from a high value, at which power transfer is more efficient, e.g. a maximum permissible voltage or the nominal rated voltage. With the value of the voltage at a specified low value, the value of the current is then altered to vary the power output of the DC link. If the power output is to be reduced, the current may also be reduced in order to reach the required power output. In general, for a given power output, the current is higher in the maintenance mode than in other modes, such as a power transfer mode.

The operational contributors for space charge accumulation are temperature and voltage. Both temperature of the insulation and electric field applied to the insulation are a function of space charge accumulation as they both impact the conductivity of the insulation. The shunt conductance of the insulation allows charges to travel across the insulation more or less rapidly. As the DC conductivity is dependent on temperature, a gradient in temperature will cause a gradient in the DC conductivity. Consequently the DC conductivity gradient can cause space charge formation.

The operational lever to mitigate space charge accumulation is the electric field at the interfaces between the different layers of the cable 30. If the electric field is higher than the space charge injection threshold, space charge accumulation occurs. The electric field at the interfaces can be regulated with changes in temperature and voltage. Thus by regulating the current and voltage carried by the cable, the electric field distribution across the cable insulation is also regulated. Increasing the current and reducing the voltage will increase the temperature of the cable and facilitate the diffusion of the space charge accumulation in the absence of voltage.

In other embodiments, the polarity of the voltage applied to the DC link may be reversed in the maintenance mode. That is, a cable previously at a positive voltage may be held at a negative voltage while in the maintenance mode, and a cable previously at a negative voltage may be held at a positive voltage while in the maintenance mode.

The control system 20 is able to control the voltage and current which are applied to the DC link 15 (and their polarity) through control of one or more of: the turns ratio of either or both of the transformers 21, 23; the converters 22, 24; the voltages in either converter (i.e. the current being proportional to the voltage difference); a dynamic braking system (DBS) and/or controlling a current flow controller (CFC) in either the first station 14 or the second station 16.

As the cable is placed under increased thermal stress during the maintenance mode, in some embodiments, and power is transferred less efficiently than in other modes where the voltage is higher, the DC link is placed in the maintenance mode only temporarily (e.g. a number of hours). In step 58, the DC exits the maintenance mode and resumes normal operation in step 54. Normal operation may include, for example, a mode of operation in which power transfer efficiency is maximised (e.g. where the voltage is at a relatively high or maximum permissible value, or a nominal rated value).

The disclosure above has focussed on implementation of a maintenance mode in a simple, point-to-point network 10. However, the invention is equally applicable in more complicated networks.

Figure 7A:
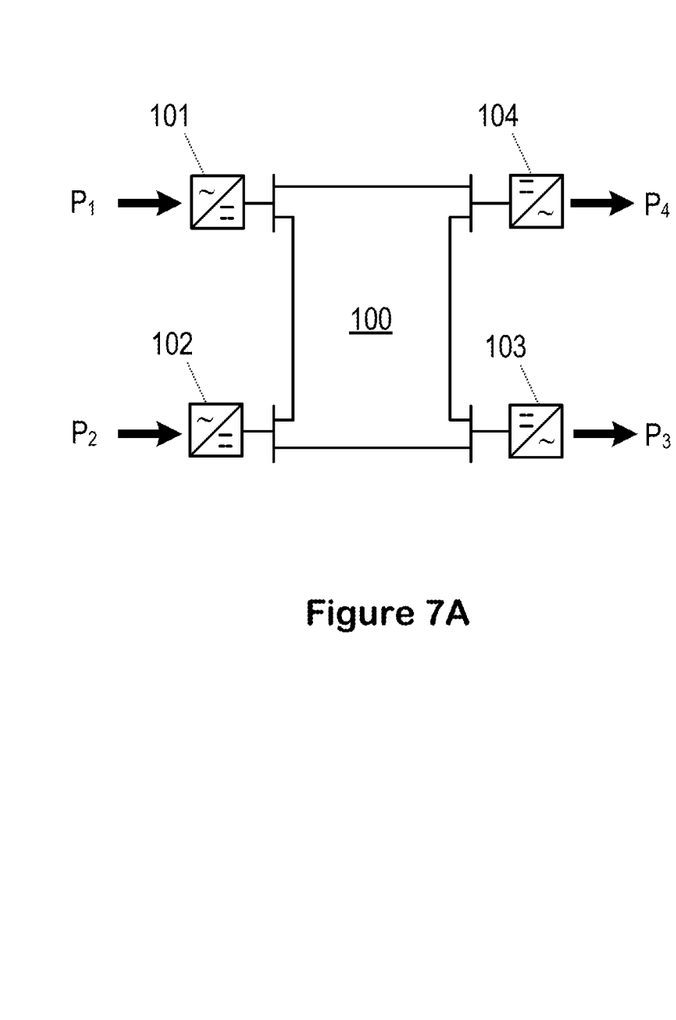
FIGS. 7A and 7B illustrate an example of a DC network comprising multiple DC links and multiple stations, and its operation while at least one of those DC links is in a maintenance mode.

FIG. 7A shows a meshed multi-terminal network 100. The network 100 comprises four converter stations 101, 102, 103, 104. The network also comprises a control system (not illustrated), substantially as shown in FIG. 2 and described above. The first converter station 101 receives an AC power supply $P_1$, and outputs DC power over two cables. Similarly, the second converter station 102 receives an AC power supply $P_2$ and converts it to DC; the third converter station 102 receives an AC power supply $P_3$ and converts it to DC; and the fourth converter station 102 receives an AC power supply $P_4$ and converts it to DC. The first station 101 receives and outputs DC power over two cables coupled respectively to the second station 102 and the fourth station 104. The second station 102 is additionally coupled to the third station 103; and the third station 103 is additionally coupled to the fourth station 104.

Figure 7B:
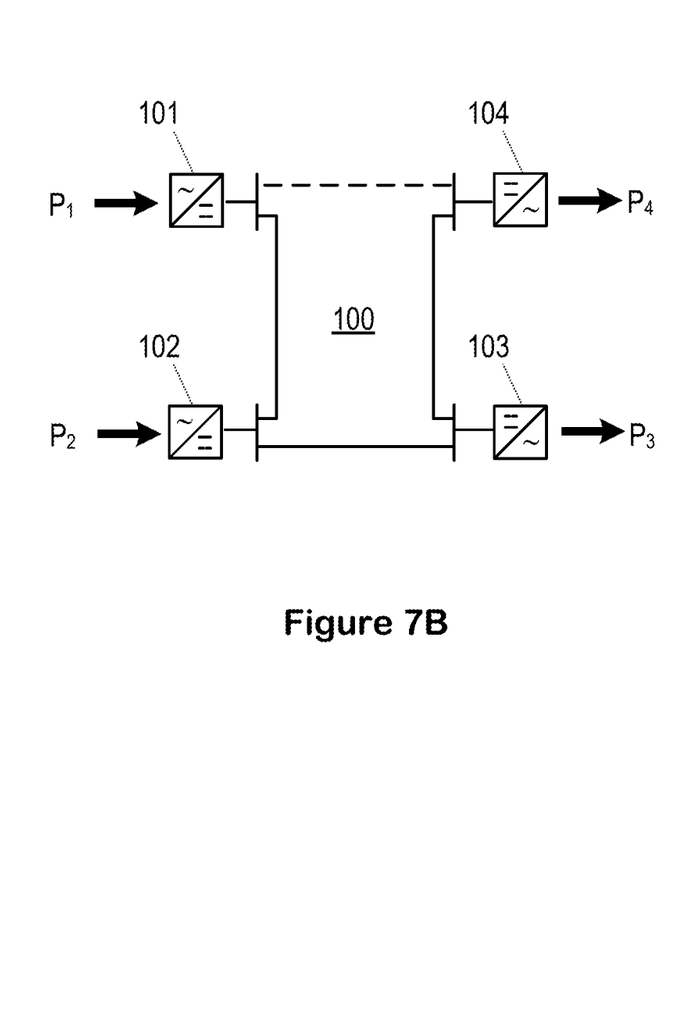

FIG. 7B shows the same network 100 when one of the DC links is in a maintenance mode. Specifically, the DC link between the first station 101 and the fourth station 104 is placed in a maintenance mode (shown by a dashed line). According to embodiments of the invention, each of the other links is placed in a compensatory mode of operation in which power output is increased to compensate for the DC link which is in maintenance. In an embodiment, the control system may place a DC link in a maintenance mode only when the overall load on the network is relatively low, i.e. below a threshold. This allows the other links to be placed in a higher-power compensatory mode of operation without exceeding their maximum power limits.

The present invention thus provides methods and apparatus for controlling HVDC power transmission systems so as to increase the effective lifetime of cables carrying the DC power (and particularly the extruded polymer insulation of those cables). By entering a maintenance mode in which the voltage is reduced below a threshold value at which space charge can accumulate, and in which the current is relatively higher than would otherwise be the case to achieve a given power output, space charge accumulation is mitigated and space charge diffusion is facilitated.

Those skilled in the art will appreciate that various amendments and alterations can be made to the embodiments described above without departing from the scope of the invention as defined in the claims appended hereto.

The invention claimed is:

1. A method of operating a high-voltage direct-current (HVDC) system, the HVDC system comprising at least one DC link, at least part of the DC link comprising a cable with extruded polymer insulation, the DC link being operable in a maintenance mode and at least one other mode of operation, the method comprising:
    entering the maintenance mode, in which the electrical properties applied to the cable are varied so as to facilitate diffusion of space charge accumulation in the extruded polymer insulation; and
    measuring an electrical characteristic in the cable, comparing a measured value of the electrical characteristic to a threshold, and entering the maintenance mode based at least in part on the comparison.

2. The method of claim 1, wherein, in the maintenance mode, the electrical properties applied to the cable are varied so as to induce heating in the cable.

3. The method of claim 1, wherein, in the maintenance mode, a current applied to the cable is increased relative to the value of the current in the at least one other mode of operation.

4. The method of claim 3, wherein, in the maintenance mode, the current is increased to its maximum permitted value.

5. The method of claim 1, wherein, in the maintenance mode, a voltage applied to the cable is decreased relative to the value of the voltage in the at least one other mode of operation.

6. The method of claim 5, wherein, in the maintenance mode, the voltage is decreased to 0% or more of its maximum permitted value.

7. The method of claim 1, wherein, in the maintenance mode, a polarity of the voltage applied to the cable is reversed relative to its polarity in the at least one other mode of operation.

8. The method of claim 1, further comprising entering the maintenance mode periodically.

9. The method of claim 8, wherein a frequency in which the maintenance mode is entered increases as a function of the lifetime of the cable.

10. The method of claim 1, further comprising entering the maintenance mode during or after a transition from a first period in which a load on the system is relatively high to a second period in which the load on the system is relatively low.

11. The method of claim 1, wherein the HVDC system comprises a plurality of DC links, and further comprising, when one DC link of the plurality of DC links is in the maintenance mode, entering a compensatory mode of operation for at least one other DC link of the plurality of DC links in which the power transferred by the at least one other DC link is increased relative to other modes of operation of the DC links.

12. The method of claim 11, wherein, when one DC link of the plurality of DC links is in the maintenance mode, a compensatory mode of operation is entered for all other DC links of the plurality of DC links.

13. The method of claim 1, wherein the step of entering the maintenance mode comprises generating control signals for one or more of:
one or more transformers connected to the HVDC system;
one or more voltage converters connected to the HVDC system;
a dynamic braking system (DBS) to the HVDC system; and
a current flow controller (CFC) to the HVDC system,
in order to vary the electrical properties applied to the cable.

14. A control system for a high-voltage, direct-current (HVDC) system, the HVDC system comprising at least one DC link, at least part of the DC link comprising a cable with extruded polymer insulation, the DC link being operable in a maintenance mode and at least one other mode of operation, the control system being configured to:
control the DC link to enter the maintenance mode, in which the electrical properties applied to the cable are varied so as to induce heating in the cable and facilitate diffusion of space charge accumulation in the extruded polymer insulation; and
measure an electrical characteristic in the cable, comparing a measured value of the electrical characteristic to a threshold, and entering the maintenance mode based at least in part on the comparison.

15. The control system of claim 14, wherein, in order to vary the electrical properties applied to the cable, the control system is configured to generate control signals for one or more of:
one or more transformers connected to the HVDC system;
one or more voltage converters connected to the DC link;
a dynamic braking system connected to the DC link; and
a current flow controller connected to the DC link.

* * * * *